(12) United States Patent
Gangopadhyay et al.

(10) Patent No.: US 8,512,490 B2
(45) Date of Patent: Aug. 20, 2013

(54) HOMOGENEOUS MESOPOROUS NANOENERGETIC METAL OXIDE COMPOSITE FABRICATION METHODS

(75) Inventors: Shubhra Gangopadhyay, Columbia, MO (US); Daniel Tappmeyer, Warrenton, MO (US); Andrey Bezmelnystin, Columbia, MO (US); Rajagopalan Thiruvengadathan, Columbia, MO (US); Rajesh Shende, Rapid City, SD (US); Bhushan Mehendale, Land-O-Lakes, FL (US); Steve Apperson, Columbia, MO (US); Sved Barizuddin, Columbia, MO (US); Keshab Gangopadhyay, Columbia, MO (US)

(73) Assignee: The Curators of the University of Missouri, Columbia, MO (US)

( * ) Notice: Subject to any disclaimer, the term of this patent is extended or adjusted under 35 U.S.C. 154(b) by 0 days.

(21) Appl. No.: 13/607,267

(22) Filed: Sep. 7, 2012

(65) Prior Publication Data

US 2013/0000800 A1    Jan. 3, 2013

Related U.S. Application Data

(62) Division of application No. 12/001,306, filed on Dec. 11, 2007, now Pat. No. 8,293,040.

(60) Provisional application No. 60/874,177, filed on Dec. 11, 2006.

(51) Int. Cl.
*C06B 45/00* (2006.01)
*C06B 45/04* (2006.01)
*C06B 33/00* (2006.01)
*D03D 23/00* (2006.01)
*D03D 43/00* (2006.01)

(52) U.S. Cl.
USPC ............. 149/109.6; 149/2; 149/17; 149/37; 149/108.2; 149/109.2

(58) Field of Classification Search
USPC ............. 149/37, 2, 17, 108.2, 109.2, 109.6
See application file for complete search history.

(56) References Cited

U.S. PATENT DOCUMENTS 3,255,059 A   6/1966  Hammeresh et al.
3,350,245 A  10/1967  Dickinson
(Continued)

FOREIGN PATENT DOCUMENTS

WO   WO2007/053397   5/2007
WO   WO2007/053543   5/2007
(Continued)

OTHER PUBLICATIONS

Apperson, S., et. al., "Generation of fast propagating combustion and shock waves with copper oxide/aluminum nanothermite composites", *Applied Physics Letters*, 91, 243109, 2007.

(Continued)

*Primary Examiner* — James McDonough
(74) *Attorney, Agent, or Firm* — Greer, Burns & Crain Ltd.

(57) ABSTRACT

The invention provides methods for making homogeneous metal oxide nanoenergetic composites. A method of the invention forms a metal oxide nanostructure via a sol-gel process with surfactant templating. Metal nanoparticles are introduced into the metal oxide nanostructure via wet impregnation.

10 Claims, 7 Drawing Sheets

(56) References Cited

U.S. PATENT DOCUMENTS

| | | | |
|---|---|---|---|
| 3,709,747 | A | 1/1973 | Nixon et al. |
| 5,232,798 | A | 8/1993 | Goldstein et al. |
| 5,517,802 | A | 5/1996 | Weder |
| 6,199,484 | B1 | 3/2001 | Martinez-Tovar |
| 6,298,784 | B1 | 10/2001 | Knowlton et al. |
| 6,517,802 | B1 | 2/2003 | Xiao et al. |
| 6,539,869 | B2 | 4/2003 | Knowlton et al. |
| 6,712,917 | B2 | 3/2004 | Gash et al. |
| 6,733,828 | B2 | 5/2004 | Chao et al. |
| 6,740,403 | B2 | 5/2004 | Gogotski et al. |
| 6,818,081 | B2 * | 11/2004 | Gash et al. ............ 149/19.92 |
| 6,818,344 | B2 * | 11/2004 | Daoud ................ 429/112 |
| 6,962,634 | B2 | 11/2005 | Nielson |
| 6,986,819 | B2 | 1/2006 | Tillotson et al. |
| 7,025,840 | B1 * | 4/2006 | Adams .............. 149/108.2 |
| 7,192,649 | B1 * | 3/2007 | Jouet et al. ............ 428/457 |
| 2002/0104599 | A1 * | 8/2002 | Tillotson et al. ........ 149/19.92 |
| 2003/0096897 | A1 | 5/2003 | Nielson et al. |
| 2003/0108683 | A1 | 6/2003 | Wu |
| 2003/0145924 | A1 | 8/2003 | Carter, Jr. |
| 2004/0005723 | A1 | 1/2004 | Empedocles et al. |
| 2004/0056458 | A1 | 3/2004 | Daoud |
| 2004/0203071 | A1 | 10/2004 | Chase et al. |
| 2005/0189053 | A1 | 9/2005 | Pile et al. |
| 2005/0216075 | A1 | 9/2005 | Wang et al. |
| 2006/0236887 | A1 | 10/2006 | Childs et al. |
| 2007/0095445 | A1 * | 5/2007 | Gangopadhyay et al. ...... 149/37 |
| 2007/0099335 | A1 | 5/2007 | Gangopadhyay et al. |
| 2010/0032064 | A1 * | 2/2010 | Dreizin et al. ............ 149/37 |
| 2010/0279102 | A1 | 11/2010 | Gangopadhyay et al. |

FOREIGN PATENT DOCUMENTS

| | | |
|---|---|---|
| WO | WO2007/095545 | 8/2007 |
| WO | WO2007/099335 | 9/2007 |
| WO | WO2008/045101 | 4/2008 |
| WO | WO2008/048275 | 4/2008 |

OTHER PUBLICATIONS

Baer, M.R., Kipp, M.E. and Swov, F.V., "Micromechanical modeling of heterogeneous materials", Sandia National Laboratories, Albuquerque, New Mexico 87185.

Beloni, Ervin et al., "Development of Insensitive High Energy Density Nanomaterials", *American Institute of Aeronautics and Astronautics*.

Bowden, F.P. And Yoffe, A.D., "Initiation and growth of explosions in liquids and solids", Cambridge University press, Cambridge, 1952.

Brousseau, Patrick et. al., "Nanometric Aluminum in Explosives", *Propellants, Explosives, Pyrotechnics*, 27, p. 300-306, 2002.

Clapsaddle, B.J.; A.E. Gash, K.B. Plantier, M.L. Pantoya, J.H. Satcher, Jr., R.L. Simpson, "Synthesis and Characterization of Mixed Metal Oxide Nanocomposite Energetic Materials", *Proceedings of the 31st International Pyrotechnics Seminar*, May 12, 2004.

Davis, S.A.; S.L. Burkkett, N.H. Mendeison and S. Mann, "Bacterial templating of ordered macrostructures in silica and silica-surfactant mesophases", Nature, 1997, 385, 420-423.

Deeds, M., Sandborn P., Swaminathan R., "Packaging of MEMS based safety and arming device", IEEE Proceedings of the intersociety conference on thermal phenomena, 2000, pp. 107-112.

Fu, Y.Y.; R.M. Wang, J. Xu, J. Chen, Y. Yan, A.V. Narlikar, H. Zhang, "Synthesis of Large Arrays of Aligned $\alpha$-$Fe_2O_3$ Nanowires", Chemical Physics Letters 379 (2003) 373-379.

Gash et al., "Nanostructured Energetic Materials with Sol-Gel Methods" Materials Research Society, Fall 2003 Meeting, Nov. 26, 2003.

Gavens, A.J., Heerden, D.V., Mann A.B., Reiss, M.E., Weihs, T.P., "Effect of intermixing on self propagating exothermic reactions in Al/Ni nanolaminate foils", Journal of Applied Physics, 87(3) (2000) 1255-1263.

Granier, John J; Michelle L. Pantoya, "Laser Ignition of Nanocomposite Thermites", *Combustion and Flame*, vol. 138, 2004, pp. 373-383.

Greaves, C., "The direct conversion of heat into electricity Thermoelectric conversion and thermionic conversion" Physics Education, 1968, vol. 3 printed in Great Britain, 330-337.

Hagelstein, P.L.; Y. Kucherov, "Enhancement of Thermal to Electrical Energy Conversion with Thermal Diodes", Mat Res. Soc. Symp. Proc. vol. 691, 2002 Materials Research Society. G8.37.1-G837.6.

Hagelstein, P.L.; Y. Kucherov, "Enhanced figure of merit in thermal to electrical energy conversion using diode structures", Appl. Phys. Lett. vol. 81, 2002, 559-561.

Hardwick, Neil T., "Controlling ESD through Polymer Technology", www.schaffner.com.

Jones, David E.G., et. al., "Hazard Characterization of Aluminum Nanopowder Compositions", *Propellants, Explosives, Pyrotechnics* 28, No. 3, 2003.

Kang, T.; Y. Park, K. Choi, J.S. Lee, and J. Yi, "Ordered mesorporous silica (SBA-15) dramatized with imidazole-containing functionalities as a selective absorbent of precious metal ions", J. Mater. Chem., 14 (2004) 1043-49.

Kim, Soo H.; Michael R. Zachariah, "Enhancing the Rate of Energy Release from NanoEnergetic Materials by Electrostatically Enhanced Assembly", *Advanced Materials*, vol. 16, No. 20, Oct. 18, 2004, pp. 1821-1825.

Kliche, G.; et al., "Far-infrared spectroscopic investigations on CuO", *Physical Review*, vol. 42, No. 16, Dec. 1, 1990, pp. 10060-10066.

Kwok, Queenie S.M, et. al., "Characterization of Aluminum Nanopowder Compositions", *Propellants, Explosives, Pyrotechnics* 27, p. 229-240, 2002.

Laritchev, Mikhail et. al., "New Reactive Surface Coatings for Al Metal Nanoparticles", *36th Annual Conference of ICT & 32nd International Pyrotechnics Seminar*, Jun. 28-Jul. 1, 2005.

Lessard, P., et. al., "Burn Rate Studies of Composite Propellants Containing Ultra-Fine Metals", *Energetic Materials*, 2001.

Lewis, D.H., Jr.; Janson, S.W.; Cohen, R.B.; Antonsson, EK, "Digital MicroPropulsion", The Aerospace Corporation, California Institute of Technology, pp. 517-522.

Lin, H.-P.; S. Cheng and C.-Y. Mou, "Mesoporous Molecular Sieves MCM-41 with a Hollow Tubular Morphology", 10, 1998, 581-589.

Malynych, Serhiy; Igor Luzinov, George Chumanov, Poly (Vinyl Pyridine) as a Universal Surface Modifier for Immobilization of Nanoparticles, *J. Phys. Chem.B*, vol. 106, 2002, pp. 1280-1285.

Mehendale, Bhushan Rajesh Shende, Senthil, Subramanian, Shubhra Gangopadhyay, "Nanoenergetic Composite of Mesoporous Iron Oxide and Aluminum Nanoparticles", *Journal of Energetic Materials*, vol. 24, 2006, p. 341-360.

Merzhanov, A.G., "The Chemistry of Self-Propagating High Temperature Synthesis," J. Mater. Chem. 14 (2004) 1779-1786.

Merzhanov, A.G. 1990. Combustion and Plasma Synthesis of High Temperature Materials, edited by Munir, Z.A. and Holt, J.B. New York:VCH.

Miziolek, Andrzej W; "Nanoenergetics: An Emerging Technology Area of National Importance", *Amptiac Quarterly*, vol. 6, No. 1, pp. 43-48 and 67.

Moore, J.J. and Feng H.J. "Combustion Synthesis of Advanced Materials: Part I. Reaction Paramters" Prog. Mater. Sci. 39 (1995) 243-273.

Moore, J.J. and Feng H.J. "Exothermic Reaction Synthesis", 295-311. Syntheis/Processing of Lightweight Metallic Materials Edited by F.H. Froes, C. Suryanarayana, and C.M. Ward—Close the Minerals, Metals & Materials Society, 1995.

Mott-Smith, H.M.; Irving Langmuir, "The theory of collectors in gaseous discharges", Physical Review, Oct. 1926, V. 28, 727-763.

C.Y. Mou et al., "Control of Morphology in Synthesizing Mesoporous Silica", *Pure Appl. Chem.* vol. 72, Nos. 1-2, 2000, pp. 137-146.

Music, S.; S. Krehula, S. Popovic, "Thermal Decomposition of $\beta$-FeOOH", *Materials Letters*, vol. 58, 2004, pp. 444-448.

Munir, Z.A. and Anselmi-Tamburini "Self-Propagating Exothermic Reactions: the Synthesis of High-Temperature Materials by Compustion" (1989) 277-365.

Newkome, G.R.; Woosley, B.D.; He, E,; Moorefield, C.D.; Guter, R.; Baker, G.R.; Escamilla, G.H.; Merrill, J. ; Luftmann, H.

"Supramolecular chemistry of flexible, dendritic-based structures employing molecular recognition" Chem. Commun. 1996, 2737-2738.

Newkome, G.R.; He, E.; Moorefield, C.N., "Suprasupermolecules with Novel Properties:Metallodendrimers" Chem. Rev. 99 (1999) 1689-1746.

Osbourne, Dustin T., "The Effects of Fuel Particle Size on the Reaction of Al/Teflon Mixtures", *Submitted to the Graduate Faculty of Texas Tech University*, May 2006.

Prakash, Anand et al., Synthesis and Reactivity of a Super-Reactive Metastable Intermolecular Composite Formulation of $Al/KM_nO_4$.

Raman, Narayan K.; Mark T. Anderson, and C. Jeffrey Brinker, "Template-Based Approaches to the Preparation of Amorphous, Nanoporous Silicas" Chem. Mater. 8 (1996) 1682-1701.

Redner, Paul; Steven Nicolich, Shybhra Gangopadhyay and Rajesh Shende, "The Development of Energetic Nanocomposites for the Warfighter", Particle Technology Forum, The 2005 Annual Meeting (Cincinnati, OH), Nov. 3, 2005.

Senturia, Stephen D.; "Microsystem Design", Kluwer Academic Publishers, Boston/Dordrecht /London.

Sheffield, S.A., Gustaven, R.L., Alcon, R.R., Graham, R.A. and Anderson, M.U., "Particle velocity and stress measurements in low density HMX," High pressure Science and Technology (1994) 1377-80.

Shende, Rajesh et. al., "Nanoenergetic Composites of CuO Nanorods, Nanowires, and Al-Nanoparticles", *Propellants, Explosvies, Pyrotechnics*, vol. 33, Issue 2, p. 122-130, Apr. 2008—published online Mar. 13, 2008.

Stewart D.S., "Miniaturization of explosive technology and microdetonics", XXIICTAM, Aug. 15-21, 2004, Warsaw, Poland.

Takayama, K., Saito, T. "Shock Wave/Geophysical and Medical Applications", Annual Review of Fluid Mechanics, 36 (2004) 347-49.

Technical Discussion in website http://www.risi-usa.com, 2000.

Tripkovic, Amalija V. et al., "Comparison of formic acid oxidation at supported Pt catalyst and at low-index Pt single crystal electrodes insulfuric acid solution", *J. Serb. Chem. Soc.*, vol. 68, No. 11, 2003, pp. 849-857.

Trott W.M., Erricson, K.L., Ultra highspeed studies of shock phenomenon in a miniaturized system—a preliminary evaluation, Sandia National Laboratories, Albuquerque, New Mexico 87185.

Vayssieres, Lionel; et al., "Controlled Aqueous Chemical Growth of Oriented Three-Dimensional Crystalline Nanorod Arrays: Application to Iron (III) Oxides", *Chemistry of Materials*, vol. 13, No. 2, Feb. 2001, pp. 233-235.

Vayssieres, Lionel;, et al., "Purpose-Built Anisotropic Metal Oxide Material: 3D Highly Oriented Microrod Array of ZnO", *J. Phys. Chem.*, B vol. 105, No. 17, 2001, pp. 3350-52.

Vayssieres, Lionel; "Aqueous purpose-built nanostructured metal oxide thin films", *Int. J. of Material & Product Technology*, vol. 18, Nos. 4/5/6, 2003, pp. 313-337.

Vayssieres, Lionel; et. al., "Size Tailoring of Magnetite Particles Formed by Aqueous Precipitation: An Example of Thermodynamic Stability of Nanometric Oxide Particles", *Journal of Colloid and Interface Science*, vol. 205, 1998, pp. 205-212.

Venkatasubramanian, Rama; Edward Siivola, Thomas Colpitts & Brooks O'Quinn "Thin-film thermoelectric devices with high room-temperature figures of merit" Nature vol. 413, 2001, 597-602.

Yang, X.; S. Chen, S. Zhao, D. Li, and H. Houyma. "Synthesis of copper nanorods using electrochemical methods" J Serb. Chem. Soc. 68 (11) (2003) 843-847.

Zhang, Kaili; Chou, S.K.; Ang, S.S., "MEMS-based solid propellant microthruster design, simulation, fabrication, and testing", Journal of Microelectromechanical Systems, vol. 13, Issue: 2, Apr. 2004, pp. 165-175.

* cited by examiner

FIG. 7 ary application Ser. No. 60/874,177, which was filed on Dec. 11, 2006.

HOMOGENEOUS MESOPOROUS NANOENERGETIC METAL OXIDE COMPOSITE FABRICATION METHODS

PRIORITY CLAIM AND REFERENCE TO RELATED APPLICATION

The application is a divisional application of prior pending application Ser. No. 12/001,306 and claims priority from that application under 35 U.S. §120, which application claims priority under 35 U.S.C. §119 from prior provisional application Ser. No. 60/874,177, which was filed on Dec. 11, 2006.

STATEMENT OF GOVERNMENT INTEREST

This invention was made with government support under Contract Number awarded by W15QKN-06-D-0031 awarded by the Department of Defense. The government has certain rights in the invention.

FIELD

A field of the invention is nanoenergetic materials. Example applications of the invention include military, mining, demolition, detonation devices, fuses, smart ammunitions, propellant initiators, propellant systems, biomedical devices and power generation devices.

BACKGROUND

Energetic materials store significant chemical energy that can be released to provide energy for a wide range of purposes. Typical uses of energetic materials include as propellants, explosives, and fuels. Nanoenergetic composites take advantage of the high surface area ratios of nanoparticles to enhance the mass transfer process and rate of energy release in the self-sustaining fuel-oxidizer energetic materials reaction. Reducing the fuel and oxidizer grains physically to the nanoparticle regime minimizes mass transfer effects.

Sol-gel processes are wet-chemical process used for the fabrication of metal oxides and other materials from a chemical solution that reacts with another precursor to produce a colloid of nanometer or micrometer scaled particles dispersed in a solvent (sol), which proceeds to form an inorganic network containing a liquid phase (gel). The precursor solvent can be deposited or cast into a desired film or into a container that defines a shape prior to the formation of the gel phase. Metal oxide involves are formed by connecting metal particles with oxygen (M-O-M) or hydroxide (M-OH-M) bridges. Drying removes the liquid phase from the gel, which can be post-processed to enhance mechanical properties of the material.

A sol-gel approach for nanoenergetic composites has been described by researchers at Lawrence Livermore National Laboratories. See, Clappsdale et al, "Synthesis and Characterization of Mixed Metal Oxide Nanocomposite Energetic Materials," UCRL-PROC-204118, International Pyrotechnics Seminar Fort Collins, Colo., Jul. 12, 2004 through Jul. 16, 2004. The materials described include metal oxide/silicon oxide nanocomposites in which the metal oxide is the major component. A fuel metal, such as aluminum, is incorporated into the metal oxide/silicon oxide matrix to form energetic materials that are based on thermite reactions. Example metal oxides are tungsten trioxide and iron(III) oxide. The paper describes a sol±gel approach in order to manufacture the thermite composites. Though the use of porous iron oxide prepared using sol-gel technique in nanoenergetic application is well-known and its preparation has been expounded earlier by other researchers either by using sol-gel technique, the prior techniques result only in the formation of disordered porous structure.

Typical known methods of preparing copper oxide nanoparticles prepare the nanoparticles directly from copper ethoxide. This is an expensive material that is not readily available in commercial quantities.

SUMMARY OF THE INVENTION

The invention provides methods for making homogeneous metal oxide nanoenergetic composites. A method of the invention forms a metal oxide nanostructure via a sol-gel process with surfactant templating. Metal nanoparticles are introduced into the metal oxide nanostructure via wet impregnation.

DETAILED DESCRIPTION OF THE PREFERRED EMBODIMENTS

The invention provides methods for making homogeneous metal oxide nanoenergetic composite. A method of the invention forms a metal oxide nanostructure via a sol-gel process with surfactant templating. Metal nanoparticles are introduced into the metal oxide nanostructure via wet impregnation in a self-assembly process.

The present invention provides energetic nanocomposites having a highly uniform structure with metal fuel homogeneously distributed throughout a metal oxide oxidizer nanostructure. Preferred embodiment energetic nanocomposites have a regular and uniformly sized porosity and are prepared by a surfactant template method of making the same. Other preferred embodiment energetic nanocomposites have regular and uniformly sized nanorod structures with fuel metal particles homogeneously distributed through the structure Embodiments of the invention provide iron oxide ($Fe_2O_3$) based energetic nanocomposites and porous copper oxide (CuO) nanoparticle based energetic nanocomposites.

Methods of the invention provide for the formation of uniformly structured metal oxides that are homogenous. The surfactant templating produces a high level of homogeneity because of the well-defined micellar size of the surfactant impregnated with polymer surfactant and fuel particles for resultant homogenous nanoenergetic metal oxide composites. Methods of the invention, and accordingly the resultant homogenous nanoenergetic metal oxide composites, can be tuned to achieve different combustion characteristics, e.g., combustion speed, pressure, reactivity etc.

In a preferred fabrication method of the invention regular and uniformly mesoporous metal oxide nanocomposite is made using a surfactant template method via sol gel processing with fuel nanoparticles impregnated and homogeneously distributed into the regular and uniformly mesoporous metal oxide, which is preferably $Fe_2O_3$ or CuO. The homogeneous distribution of oxidizer and fuel in nanocomposites of the invention provides high rates of energy release.

Preferred fabrication methods of the invention provide for the preparation of ordered energetic nanocomposites with low-cost materials and techniques that are suitable for commercial scale fabrication. A preferred embodiment method of preparing uniformly structured nanoenergetic mesoporous CuO utilizes relatively low-cost precursor material. In a preferred embodiment, copper oxide nanoparticles are made by first forming a gel of copper hydroxide from a mixture of a copper chloride solution and a surfactant diluted in a solvent. The gel is next treated with solvents to remove impurities. Finally, the gel is calcined at controlled temperatures to form the copper oxide nanoparticles. Use of the copper chloride starting material greatly reduces the cost of generating the nanooxidizer compared to techniques that form copper oxide nanoparticles directly from a copper ethoxide precursor. Under exemplary experimental conditions used to test the present invention, nanoparticles with a size range of about 50-100 nm having ordered pores were produced. Copper chloride is readily available in commercial quantities. With the fabrication method of the invention, the exact size and shape of the copper oxide nanoparticle is tunable through dilution of the surfactant used to make it.

A preferred embodiment method of preparing uniformly structured homogenous nanoenergetic mesoporous iron oxide composites similarly uses a combination of sol-gel chemistry and surfactant template approach. In a preferred method an iron oxide ($Fe_2O_3$) gel with ordered mesoporous structure is synthesized using a combination of sol-gel processing and surfactant templating approach. The resultant structured porous $Fe_2O_3$ particles are modified by incorporating a gas generating polymer using a wet impregnation technique. The amount of polymer can be adjusted to produce homogenous nanoenergetic metal oxide composite with different characteristics. A particularly preferred embodiment mixes modified oxidizer particles with Al nanoparticles at an optimum equivalence ratio of 1:4 to form the nanoenergetic composites. The combustion characteristics such as reactivity, combustion speed and pressure are determined as a function of polymer composition. Incorporation of additional polymers into the pores of oxidizer matrix reduces the burn rate (combustion wavespeed) while enhancing the pressure generated during the energetic reaction. The presence of more polymers in the oxidizer matrix leads to sustained pressure over a longer period of time facilitating their use in propellant applications. On the other hand, by reducing the polymer in the porous structure, the combustion wave speed increases significantly making the nanocomposite sell-suited for enhanced blast applications.

In preferred embodiment homogenous nanoenergetic metal oxide composites, the Electrostatic Discharge sensitivity of Al nanoparticles in the composites is reduced. Details of preferred methods for reducing the electrostatic discharge are disclosed in the application entitled Reducing Electrostatic Discharge Ignition Sensitivity of MIC Materials, filed on the same date as the present application, awarded Ser. No. 12/001,296, which application claims priority from provisional application Ser. No. 60/874,089. In preferred embodiments, Al nanoparticles are coated with perfluorooctal monofunctional trimethoxysilane (FSM) as a molecular linker layer and then an energetic polymer and then mixed with metal oxides to reduce the sensitivity of the nanoenergetic composites.

Preferred embodiments of the invention will now be discussed with respect to the drawings. The drawings may include schematic representations, which will be understood by artisans in view of the general knowledge in the art and the description that follows. Preferred embodiments will be discussed with respect to experimental example nanocomposites and methods of fabrication, while artisans will appreciate the broader commercial applications and scale-ups of the experiments that are within the scope of the invention.

General steps for forming uniformly structured homogenous nanoenergetic composites of preferred embodiments involve forming a uniformly structured oxidizer by sol gel surfactant template processing and then introducing a fuel into the oxidizer structure, which achieves the homogeneous composite. The formation of the oxidizer with surfactant templating according to preferred embodiments relies upon self-assembly of surfactant micelles. Above a certain concentration of surfactants known as the critical micellar concentration (CMC), surfactant micelles self-assemble in a solution and produce a template with uniform micelles distribution. When inorganic oxidizer precursor is introduced in the solution, hydrolysis reaction takes place around the micelles and the gelation takes place subsequently (after the gelling agent (Typically propylene oxide (PPO)) is added. Other gelling agents include, for example, cyclic ethers, and hydroxide salts. Removal of the surfactant template leaves behind the imprints of inorganic oxidizer network with pores in place of surfactant micelles. Therefore, by using surfactant templating and sol-gel methods, an oxidizer with ordered pore distribution and uniform pore sizes is readily achieved. The oxidizer can be homogeneously impregnated with fuel to complete the composite.

Surfactant templating agents permit the homogenous impregnation of the fuel atoms into the oxidizer network. This ensures homogeneous mixing of the fuel atoms with the oxidizer thus increasing the energy content and the energy release rate. Mesopores can be tailored based on the size of surfactant molecules. The hot-spot density can be controlled using impregnation techniques. Nanorod size also can be increased based on surfactant molecules so that more Al-nanoparticles can be assembled.

A preferred embodiment homogeneous mesoporous metal oxide nanoenergetic composite has a regular and uniform mesoporous nanostructure of metal oxide. Surfactant provides the regular and uniform nanostructure. Metal fuel nanoparticles are homogenously distributed through the regular and uniform nanostructure. In a preferred embodiment, the regular and uniform nanostructure is mesoporous iron oxide nanoparticles, and the composite also includes a gas generating polymer homogenously distributed throughout the regular and uniform nanostructure. A preferred gas generating polymer is Acrylamidomethyl cellulose acetate butyrate (AAMCAB) and a preferred surfactant is Brij 76. Generally, the gas generating polymer should be a polymer having several carbon, nitrogen, hydrogen and oxygen atoms.

In another embodiment, the regular and uniform nanostructure is mesoporous iron oxide nanorods, A preferred surfactant for the mesoporous nanorods is CTAB (cetyl trimethylammonium bromide.

In another preferred embodiment, the regular and uniform nanostructure comprises mesoporous CuO. For the CuO wherein the surfactant is preferably Pluronics (P123).

A preferred method for making homogeneous metal oxide nanoenergetic composite involves forming a metal oxide nanostructure via a sol-gel process with surfactant templating and introducing metal nanoparticles into the metal oxide nano structure via wet impregnation. In a preferred method where the metal oxide comprises CuO, the method includes steps of preparing a surfactant solution of a surfactant in a solvent; dissolving a water-soluble copper compound in water; diluting the surfactant solution to make nanoparticles of the desired size and shape; combining the diluted surfactant solution with the dissolved copper compound to make a liquid mixture; sonicating the liquid mixture; adding gelling agent to the liquid mixture; vigorously agitating the liquid mixture prior to formation of copper hydroxide gel; allowing the copper hydroxide gel to form; aging the copper hydroxide gel; washing the copper hydroxide gel in ethanol; and calcining the copper hydroxide gel to form the metal oxide nanostructure. The step of forming preferably includes reacting metal salts in solution; adjusting the pH of the solution; heating the solution to obtain a precipitate; purifying and drying the precipitate to obtain a powder; and calcinating the powder to obtain the metal oxide nanostructure.

In a preferred embodiment gelling agent comprises a hydroxide salt In a preferred emobdiment the precursor solution comprises an alcohol-soluble copper salt dissolved in alcohol.

Homogeneous $Fe_2O_3$ Oxidizers and Composites

Mesoporous Oxidizer and Composites

A first experiment involved the production of uniformly structured mesoporous iron oxide as an oxidizer for a uniformly structured homogenous nanoenergetic mesoporous iron oxide composite of the invention. The experiment used laboratory equipment and was conducted on a laboratory scale, while artisans will recognize that other equipment and corresponding techniques would be used in a commercial fabrication process based upon the example experimental embodiment.

In one beaker, 0.357 g of Brij 76 (non-ionic surfactant from Sigma Aldrich) was dissolved in 15 ml of absolute ethanol. The solution was heated to 60° C. and maintained for 15 minutes under constant stirring. This solution was referred as solution A. In another beaker, 5.0 g of $Fe(NO_3)_3.9H_2O$ was dissolved in 27.5 ml of absolute ethanol. This solution (Solution B) was placed in a sonicator bath for about 10 minutes to ensure complete dissolution of the salt in ethanol. Solution B was slowly added to solution A under gentle stirring and the resultant solution mixture was then placed in a sonication bath for 10 minutes. To this solution mixture, 25.9 ml of the propylene oxide (Sigma Aldrich, St. Louis) was added under constant stirring. On addition of propylene oxide, the solution was transformed into a gel of FeOOH (Fe-oxyhydroxide) in 1-2 min.

FeOOH gel was further processed to remove impurities by treating with acidified ethanol. In this treatment, the gel were first soaked in ethanol for 48 h at 60° C. and later annealed at 200° C. for 6 h. During calcination, FeOOH was converted into $Fe_2O_3$. A few gel samples were also treated with supercritical $CO_2$ at 80° C. and 7000 psi for 24 h to remove impurities. Impurity removal was confirmed by FTIR (Fourier Transform Infrared Spectroscopy) analysis. The synthesized ordered mesoporous $Fe_2O_3$ product was revealed by TEM (transmission electron microscopy) images, which clearly showed the formation of ordered pores homogeneously distributed throughout the matrix with a pore size of 5-10 nm.

Figure 1:
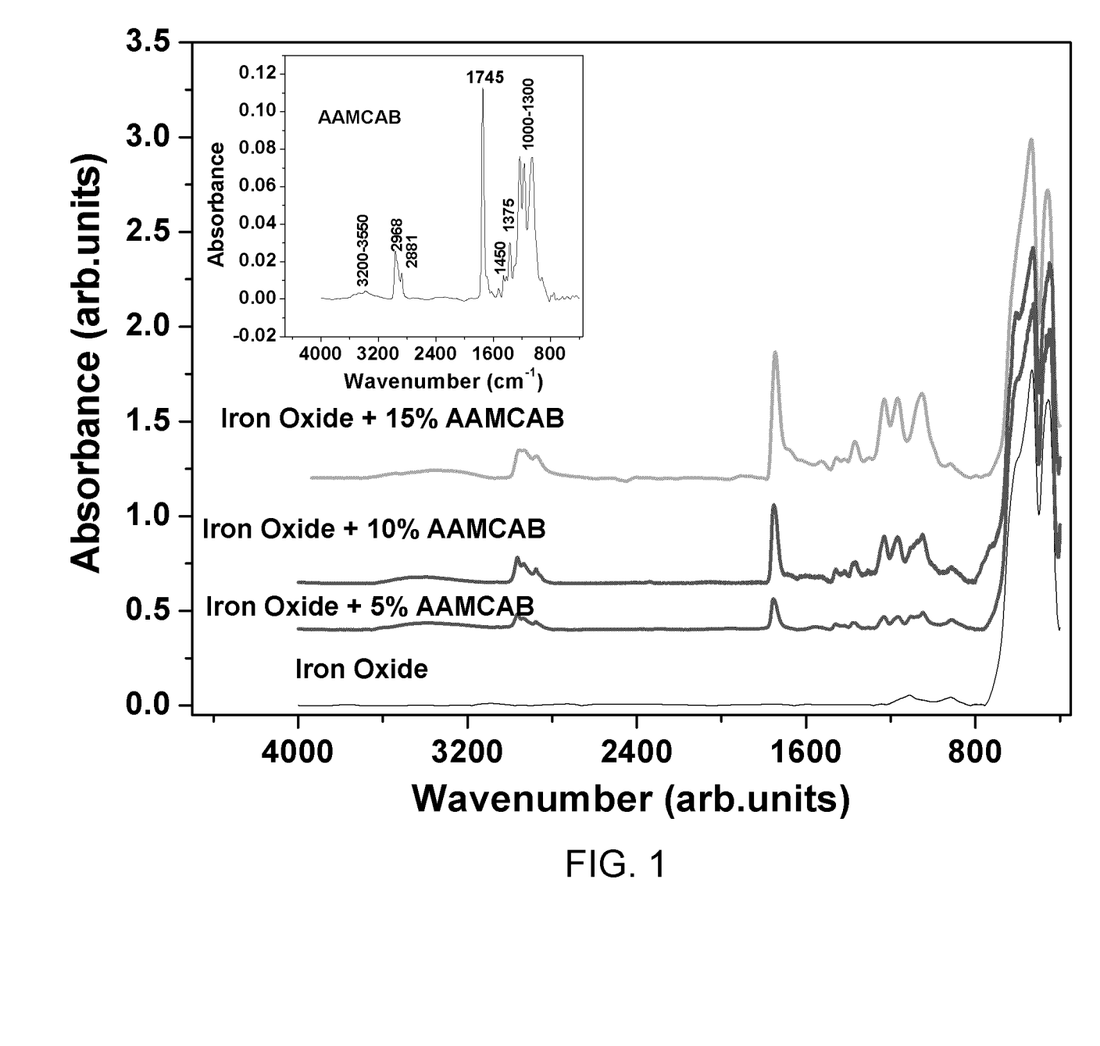
FIG. 1 shows the FTIR absorbance spectra of a uniformly structured homogenous nanoenergetic mesoporous iron oxide nanocomposite of the invention (mesoporous $Fe_2O_3$ powder homogeneously loaded with varying percent of AAMCAB)

The dried ordered porous iron oxide powder was then loaded with different weight percent of a polymer, (Acrylamidomethyl) cellulose acetate butyrate (AAMCAB) (CAS number: 97635-64-8 Sigma Aldrich, Saint Louis, Mo.) using a wet impregnation method. It was first dissolved in acetone to prepare a solution of 5-20% (wt. %). To this solution, $Fe_2O_3$ powder was added and treated in an ultrasonic bath for 2 hours and left undisturbed for 12 hours. After that, the mixture was dried at 80° C. to remove the solvent. Successful infiltration of the AAMCAB polymer was monitored with Fourier transform infrared spectroscopy. FIG. 1 shows the FTIR absorbance spectra of mesoporous $Fe_2O_3$ powder homogeneously loaded with varying percent of AAMCAB. The inset of FIG. 1 shows the FTIR spectrum of AAMCAB polymer.

Specifically, FIG. 1 shows FTIR absorbance spectra of $Fe_2O_3$ and AAMCAB loaded with different amounts (5, 10 and 15%) of $Fe_2O_3$. For reference, absorbance spectrum of AAMCAB is also shown in inset of FIG. 1. Characteristic vibrations of AAMCAB observed at 1000-1300 $cm^{-1}$, 1375-1450 $cm^{-1}$, 1745 $cm^{-1}$, 2800-3000 $cm^{-1}$ and 3200-3550 $cm^{-1}$ are attributed to C—O stretch of C—O—C group present in the aromatic ring, $CH_n$ (n=2 or 3) bending mode, C=O stretch, $CH_n$ stretching mode and O—H stretch respectively.

The bands observed at 460 $cm^{-1}$ and 535 $cm^{-1}$ are assigned to the Fe—O vibrations. A comparison of the absorbance spectra of AAMCAB loaded $Fe_2O_3$ (main figure) with that of AAMCAB alone (inset) indicates the infiltration of the polymer into the porous matrix of $Fe_2O_3$. Furthermore, with increasing amount of AAMCAB loading, the intensity of the characteristic peaks at 1000-1300 $cm^{-1}$, 1375-1450 $cm^{-1}$, 1745 $cm^{-1}$, 2800-3000 $cm^{-1}$ increase.

Typical preparation of nanoenergetic mixtures containing gas generating polymer (AAMCAB) loaded $Fe_2O_3$ as oxidizer with homogenous fuel distribution was as follows. Accurately weighed 0.2 g of oxidizer was mixed with 0.094 g of Al-nanoparticles in 2-propanol using ultrasonic bath for 6-8 hrs. When the infiltrated polymers are burnt during the high temperature thermite reaction, more gas is produced thereby increasing the generated pressure. To achieve this, AAMCAB was selected as it has several carbon and nitrogen atoms, which would combine with oxygen to produce gases on combustion. Also this polymer decomposes into several gaseous products contributing to higher pressure. Moreover, AAMCAB (Sigma Aldrich) has glass transition temperature of 118 C with density of 1.31 g/cc at 25° C. and it is completely soluble in solvents such as acetone, butanone etc. Generally, polymers that provide one or more of these attributes are preferred as a gas generating polymer.

Combustion characteristics such as combustion speed and reactivity measured in terms of the rate of pressure generated during the thermite reaction were determined as a function of the amount of polymer loading and as a function of Al particle size. The combustion speed was measured using an optical method, wherein a combination of a Tektronix TDS460A Four Channel Digital Oscilloscope (100 MHz maximum bandwidth), photodiodes and fiber optics were used. In some tests, two oscilloscopes and up to 8 recorded channels were used. A transparent Lexane tube (95 mm long, 9 mm OD and 3.2 mm ID) was filled with 200 mg of nanoenergetic mixture.

The powder filled approximately half of the tube cross section. Combustion experiments were performed in a confined geometry with both ends of the Lexane tube being closed. Initiation spark was located at the left side of the tube and a pressure sensor was at the opposite end. The reaction front position was determined by properly setting (up to seven) the collimated photodiodes, located along the test tube with 10 mm spacing interval. The combustion speed along the tube was obtained from recorded time-arrival data.

Reactivity rate tests were performed in a closed volume using a typical mass of 20 mg in a metal-well of 6.2 mm in diameter and 2 mm depth with a packing density of 0.33 g/cm$^3$. A Ni-alloy fuse wire d=0.13 mm was used for ignition of the nanothermite material. The pressure inside milliwell was monitored by a piezoelectric pressure sensor (PCB Piezotronics Model 119B12) with a maximum pressure range of 827 MPa.

Figure 2:
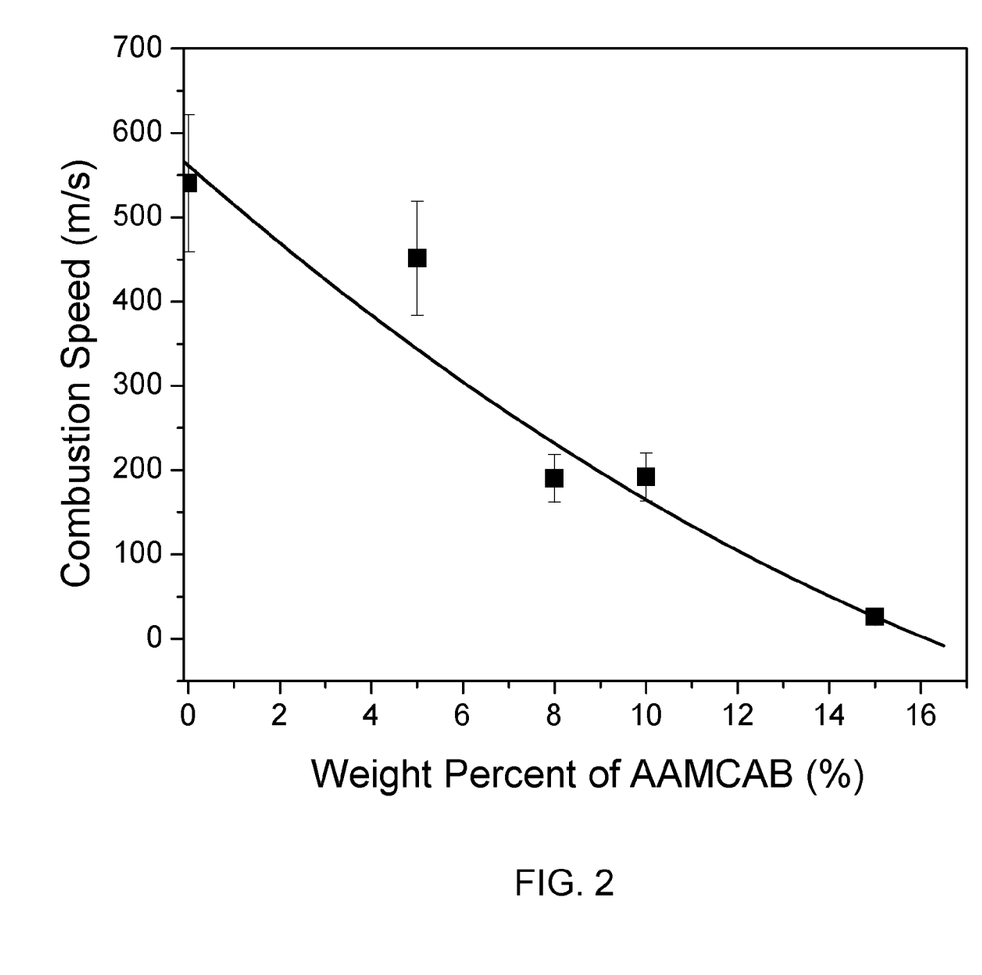
FIG. 2 is a plot of combustion speed as a function of polymer loading in a uniformly structured homogenous nanoenergetic nanporous iron oxide matrix.
Figure 3:
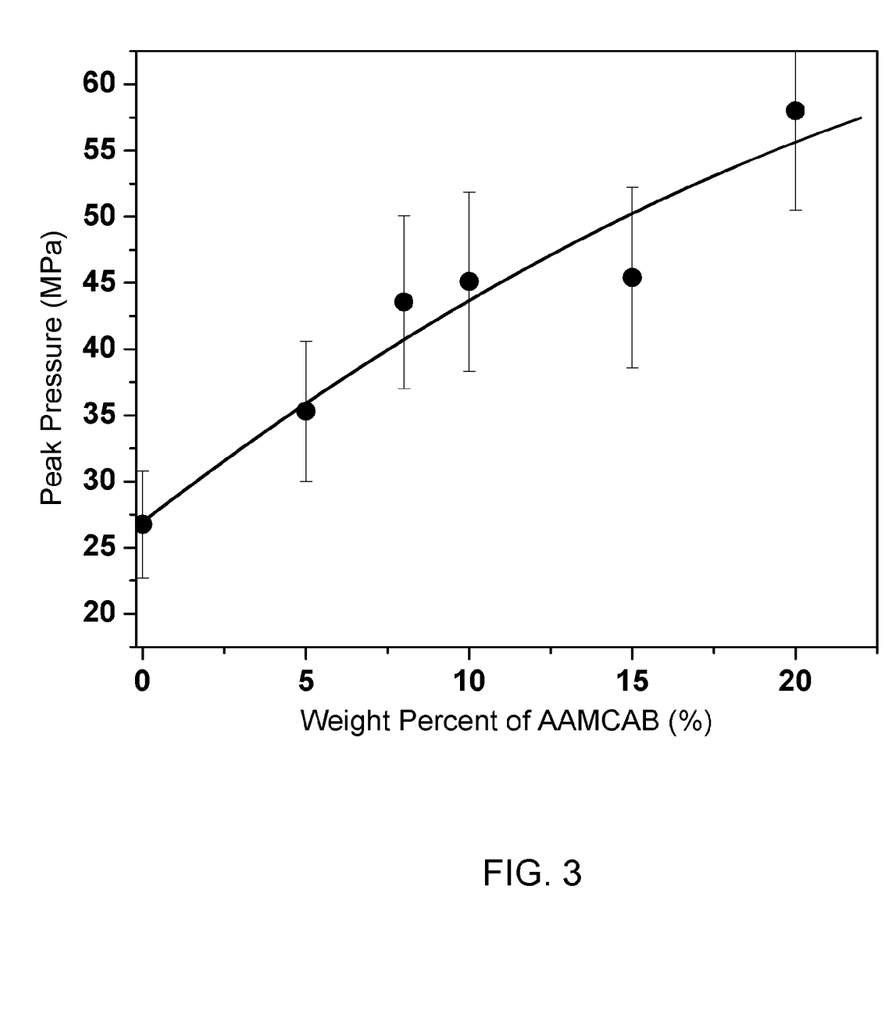
FIG. 3 is a plot of peak pressure measured in reactivity as a function of polymer loading in a uniformly structured homogenous nanoenergetic mesoporous iron oxide matrix.
Figure 4:
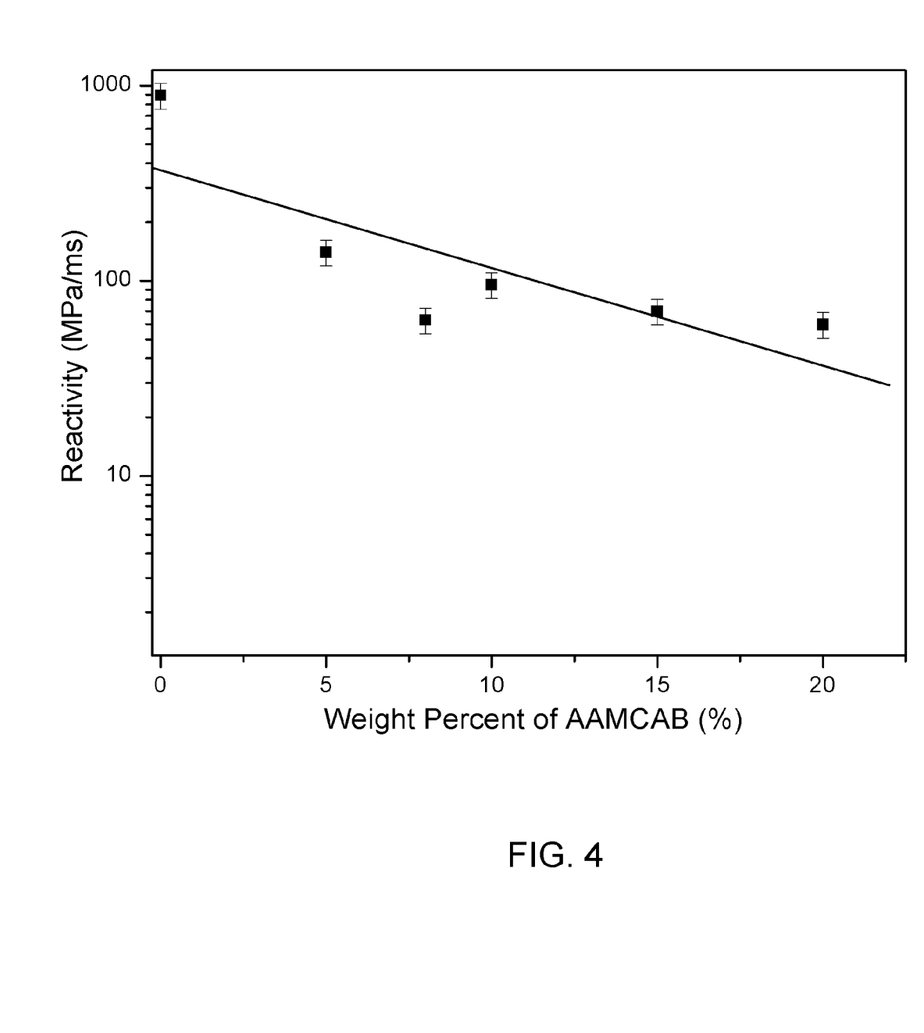
FIG. 4 is a plot of reactivity measured as a function of polymer loading in a uniformly structured homogenous mesoporous iron oxide matrix.

Data was obtained through the experiments to demonstrate that the combustion characteristics of uniformly structured homogenous nanoenergetic composites of the invention can be predetermined and selected during fabrication. The characteristics are tunable. The results are shown in FIGS. 2-4. FIG. 2 is a plot of combustion speed as a function of polymer homogeneous loading in an ordered porous iron oxide matrix. FIG. 3 is a plot of peak pressure measured in reactivity as a function of polymer loading. FIG. 4 is a plot of reactivity measured as a function of polymer loading in porous iron oxide matrix. The data show that combustion speed and reactivity goes down while the peak pressure increases with increasing polymer loading.

Figure 5:
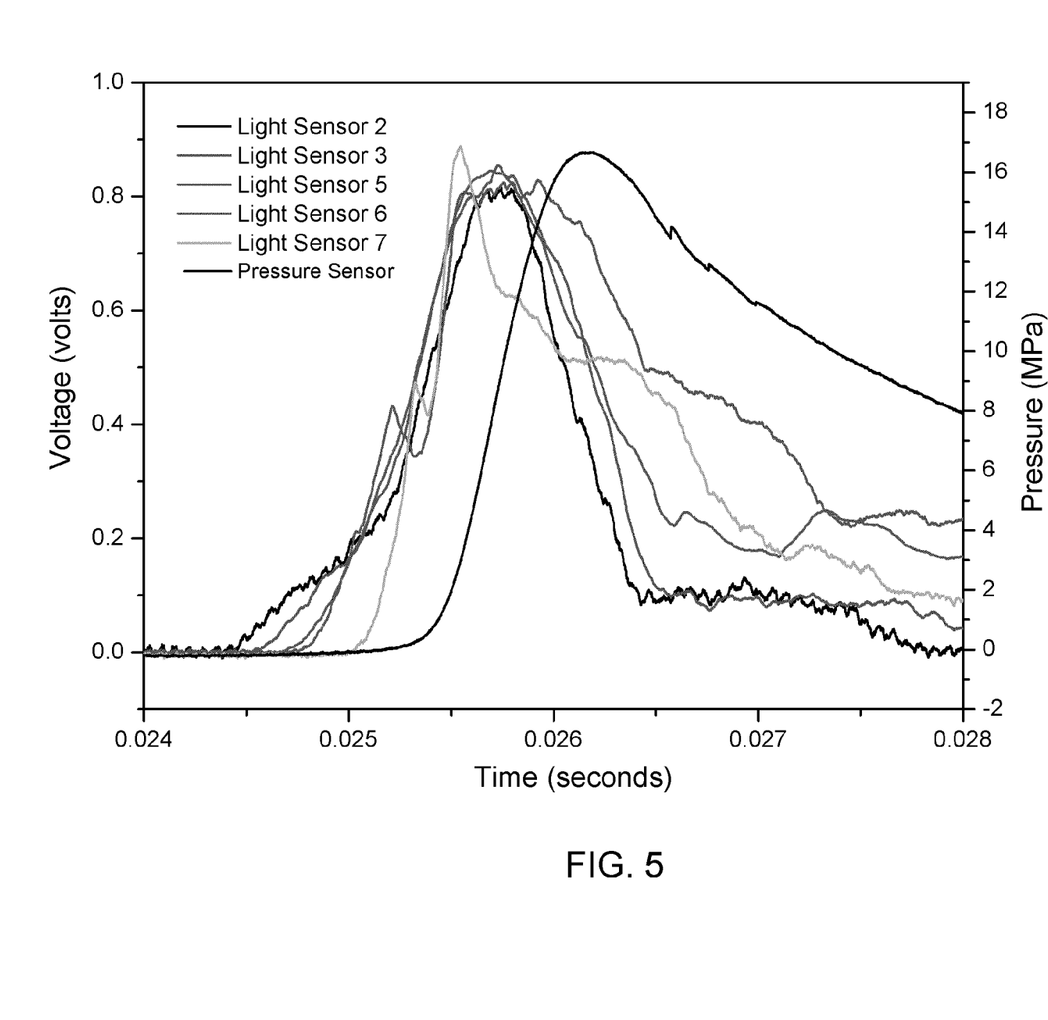
FIG. 5 is a plot of typical data obtained from simultaneous measurements of combustion wave speed (R) and pressure measurements for a uniformly structured homogenous nanoenergetic iron oxide composite ($Fe_2O_3$+10% AAM-CAB)+Al(120 nm)
Figure 6:
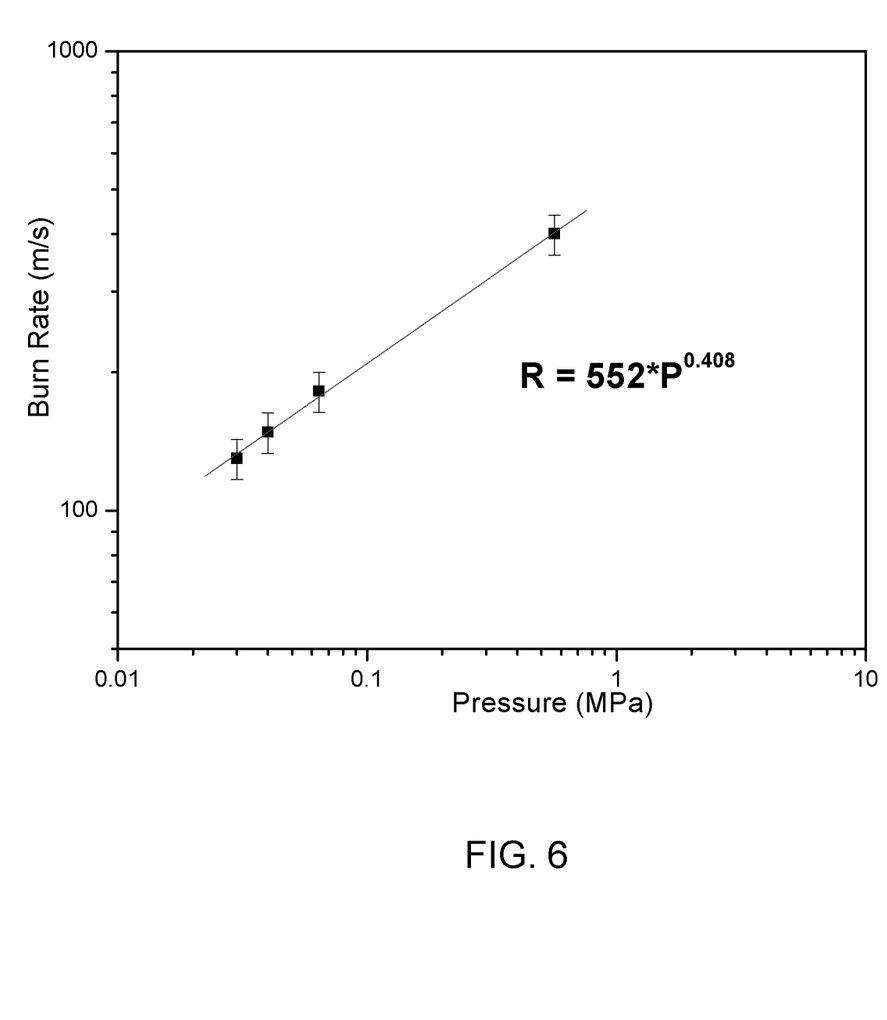
FIG. 6 plots the dependence of burn rate R on pressure P for uniformly structured homogenous nanoenergetic composites of ($Fe_2O_3$+10% AAMCAB)+Al(120 nm)

Combustion wave speed and pressure measurements were also made simultaneously. FIG. 5 shows typical data obtained from simultaneous measurements of combustion wave speed (R) and pressure measurements for a uniformly structured homogenous nanoenergetic iron oxide composite ($Fe_2O_3$+ 10% AAMCAB)+Al(120 nm) The percentage here refers to the amount of AAMCAB used with respect to the amount of iron oxide during the preparation of the polymer loading into porous matrix process. The percentage is not measured after the preparation. However, with the FTIR spectra show gradual increase in the intensity of specific peaks of AAM-CAB with increasing amounts of AAMCAB used in the preparation. This simultaneous measurement permits plotting of the dependence of R (m/sec) on pressure P (MPa) for subsonic regime, as shown in FIG. 6. The obtained data was fitted to a power law dependence for ballistic propellant, also well known as Vieille's law, $$R = \beta P^\alpha$$

where: β (m/(sec-MPa)) and a (dimensionless) refer to experimental constants. Specifically, the magnitude of the pressure exponent is required to be small in order to avoid transition to unstable burning at high pressures. FIG. 6 plots the dependence of R on P for the uniformly structured homogenous nanoenergetic composite of ($Fe_2O_3$+10% AAM-CAB)+Al. The plot fits the power law approximately with coefficients in Vieille's equation as follows:

$$R = 552 * P^{0.408}.$$

The exponent 0.408 corresponds to the propellant material. The coefficient 552 is high because of the high value of combustion wave speed of nanothermites. This can be reduced by introducing more gas generating polymer Small value of exponential slope α=0.408 shows that combustion of our nanoenergetic material ($Fe_2O_3$+10% AAMCAB)+Al is stable under high pressures and have small dependence on pressure. Tests have shown that the burn rate of the thermite materials have strong dependence on the composition rather than on pressure. This property permits the nanoenergetic composite for both propellant and enhanced blast applications.

Mesoporous Nanorod $Fe_2O_3$ with Al-Nanoparticle Composites

Other experiments prepared mesoporous nanorod oxide structures and composites with fuel particles. In this method, iron chloride ($FeCl_3.6H_2O$) (1.08 g) and 1.0 g of cetyl trimethylammonium bromide (CTAB) were dissolved in 40 ml of de-ionized water and sonicated for ½ h to ensure complete dissolution. The resultant mixture was autoclaved for 12 hrs at 80° C. The yellow colored precipitate obtained was stirred in ethanol for 12 h to remove the surfactant. The yellow product (FeOOH) was repeatedly washed with water to remove the impurities dried at 100° C. to get a dry powder. The dried powder was pulverized in a mortar and calcined at 520° C. for 4 hrs to obtain porous iron oxide nanorods. Al nanoparticles can be self-assembled on and in the mesoporous nanorods as described above.

Homogeneous Mesoporous CuO Oxidizer/Combined Oxidizer and Composites:

Experiments were also conducted to synthesize and test uniformly structured homogenous nanoenergetic CuO oxides and composites. Porous CuO nanoparticles were prepared using surfactant templating with low cost precursors. The CuO oxides are formed by first preparing a copper chloride and surfactant solution in a solvent. Propylene oxide is added to induce gelation. The gel is next treated with solvents to remove impurities. The gel is calcined at controlled temperatures to form the copper oxide uniformly structured homogenous nanoenergetic composite. Then, the porous CuO was mixed with Al nanoparticles as fuel and the combustion wave velocity was determined for samples prepared varying the surfactant concentration.

Similar to the preparation for the iron oxide composites described above, porous CuO nanoparticles was synthesized using a surfactant template approach and then Al-nanoparticles were mixed with the oxidizer to form the energetic composite. Specifically, in solution A, 0.75 g of copper chloride (Sigma Aldrich, St. Louis) was first dissolved in DI water. A stock solution of 40 wt. % of Pluronics, P123, (BASF Corporation) in ethanol was prepared separately.

Pore size and shape can be tuned by varying the concentration of the surfactant used in the synthesis. To vary the surfactant concentration, the stock solution was diluted appropriately. For example, to prepare porous CuO with 10% P123 solution, the stock solution of 40 wt. % was diluted to four times and added to solution A. The mixture was sonicated for 10 minutes. About 2.5 mL of propylene oxide was added to this mixture and then shaken vigorously immediately before the formation of copper hydroxide gel begins.

The gel is aged, typically for 24-48 hours. The gel is then washed thoroughly with ethanol through stirring for 24 hours to remove the impurities. The samples were then calcined to 450° C. in a controlled manner using a programmable furnace. Impurity removal and formation of copper oxide (CuO) was confirmed by FTIR analysis.

TEM was used to investigate the morphology of the CuO. The TEM images revealed formation of CuO nanoparticles with uniform size and shape. The average size of the nanoparticle is about 100 nm. The detailed microstructure of one such particle recorded at a higher magnification reveals the porous morphology of the nanoparticle. The pore size is about 3-4 nm for CuO nanoparticles prepared with 8 wt. %. P123.

Optimization of the process parameters permits tunable pore size and shape to be realized and optimized enhanced energetic properties to be achieved.

Fuel was then introduced into the CuO homogenous oxide. Typically 200 mg of CuO oxidizer nanoparticles were mixed with 85 mg of Al fuel nanoparticles and the mixture was sonicated in a sonic bath (Cole Parmer) for 4 hours to realize homogeneous mixing of oxidizer and fuel nanoparticles. The slurry obtained was then dried and the energetic composite was thus obtained. The performance of the energetic composite was tested by measuring the burn rate.

Figure 7:
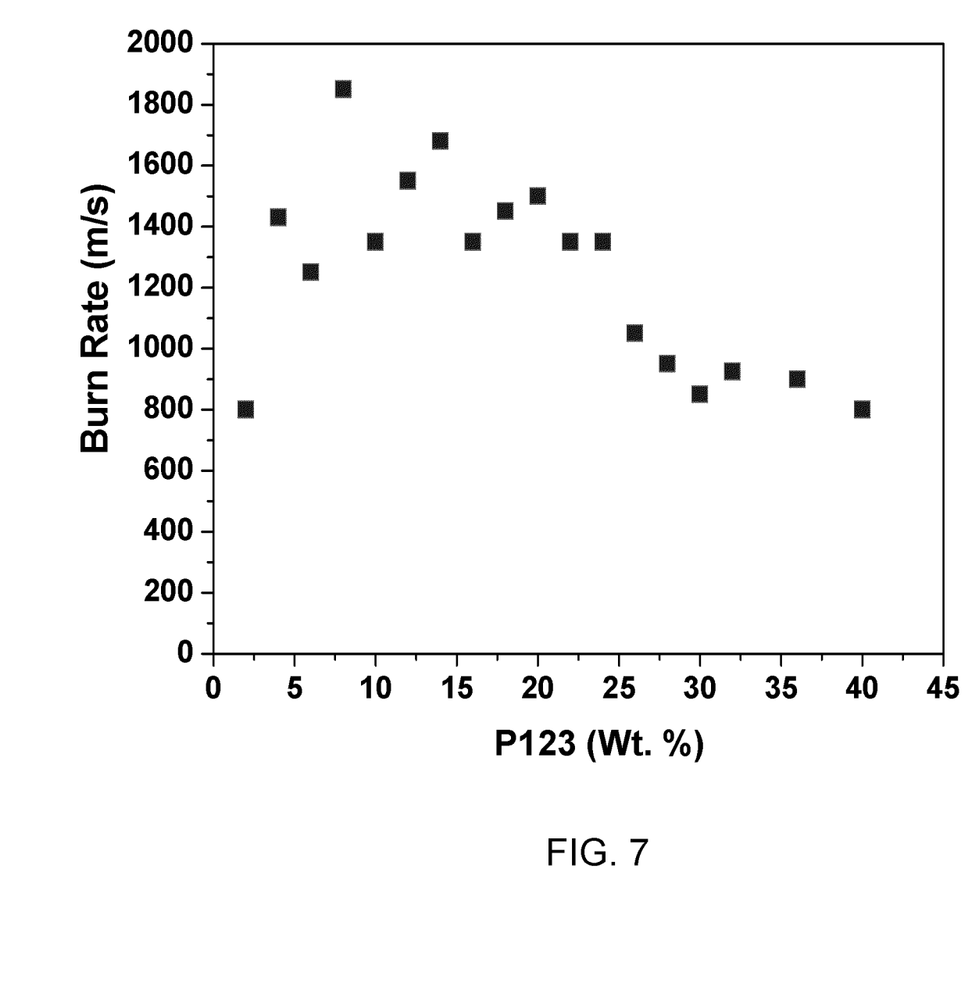
FIG. 7 plots burn rate as a function of surfactant concentration used in the preparation of uniformly structured homogenous nanoenergetic CuO.

The burn rate was measured for all samples and monitored as a function of P123 surfactant concentration used in the preparation of CuO nanoparticle composite. FIG. 7 plots burn rate as a function of surfactant concentration used in the preparation of uniformly structured homogenous nanoenergetic CuO. It is clear that the burn rate can be tuned from 800-1850 m/s by simply varying the P123 concentration and the high burn rate of 1850 m/s was obtained in case of sample prepared with 8 wt. % of P123. The process can be adjusted to achieve CuO based mesoporous energetic composites with tailored combustion characteristics.

While specific embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

The invention claimed is:

1. A method for making homogeneous mesoporous metal oxide nanoenergetic composite, the method comprising:
   forming a metal oxide nanostructure via a sol-gel process with surfactant templating; and
   introducing metal nanoparticles into the metal oxide nanostructure via wet impregnation, wherein said metal oxide comprises CuO, and said step of forming comprises:
   preparing a surfactant solution of a surfactant in a solvent;
   dissolving a water-soluble copper compound in water;
   diluting the surfactant solution to make nanoparticles of the desired size and shape;
   combining the diluted surfactant solution with the dissolved copper compound to make a liquid mixture;
   sonicating the liquid mixture;
   adding gelling agent to the liquid mixture;
   vigorously agitating the liquid mixture prior to formation of copper hydroxide gel;
   allowing the copper hydroxide gel to form;
   aging the copper hydroxide gel;
   washing the copper hydroxide gel in ethanol;
   calcining the copper hydroxide gel to form the metal oxide nanostructure.

2. The method of claim 1, wherein the sufactannt comprises poloxamer.

3. The method of claim 1, wherein the metal nanoparticles comprise Al nanoparticles.

4. A method for making homogeneous mesoporous metal oxide nanoenergetic composite, the method comprising:
   forming a metal oxide nanostructure via a sol-gel process with surfactant templating; and
   introducing metal nanoparticles into the metal oxide nanostructure via wet impregnation, wherein said step of forming comprises:
   reacting metal salts in solution;
   adjusting the pH of the solution;
   heating the solution to obtain a precipitate;
   purifying and drying the precipitate to obtain a powder;
   calcinating the powder to obtain the metal oxide nanostructure.

5. The method of claim 1, wherein the metal salts comprise an alcohol-soluble copper salt and the solution comprises alcohol.

6. A method for making homogeneous mesoporous metal oxide nanoenergetic composite, the method comprising:
   preparing a solution of copper hydroxide copper chloride and a surfactant;
   introducing a gelling agent into the solution to form a gel;
   treating the gel with solvent to remove impurities;
   calcinating the gel to form homogenous CuO oxide nanoparticle material; and
   mixing metal fuel nanoparticles with the material to form the homogenous mesoporous metal oxide nanoenergetic composite.

7. The method of claim 6, wherein the gel is aged before said treating for a period of 24-48 hours.

8. The method of claim 6, wherein said treating comprises washing with ethanol through stirring for a predetermined period.

9. The method of claim 6, wherein the ratio of CuO oxide nanoparticle material to metal fuel nanoparticles is 1:4.

10. The method of claim 1, wherein said mixing further comprises incorporating a gas generating polymer.

* * * * *

UNITED STATES PATENT AND TRADEMARK OFFICE
CERTIFICATE OF CORRECTION

PATENT NO.       : 8,512,490 B2                              Page 1 of 1
APPLICATION NO.  : 13/607267
DATED            : August 20, 2013
INVENTOR(S)      : Shubhra Gangopadhyay et al.

It is certified that error appears in the above-identified patent and that said Letters Patent is hereby corrected as shown below:

On the Title Page:

(75) Inventors:
Left Column, line 13, Inventors, line 10    Please delete "Sved" and insert --Syed-- therefor.

(56) References Cited:
Page 3, Left Column, line 27    Please delete "explosvies" and insert --explosives-- therefor.

In the Specification:

Col. 1, line 40    After "wet-chemical", please delete "process" and insert --processes-- therefor.
Col. 1, line 48    Please delete "oxide involves" and insert --oxides-- therefor.
Col. 2, line 28    Please delete "nanporous" and insert --nanoporous-- therefor.
Col. 3, line 66    Please delete "sell-suited" and insert --well-suited-- therefor.
Col. 5, line 6     Please insert --)-- after "bromide" and before the ".".
Col. 5, line 33    Please insert a --.-- after "salt".
Col. 7, line 50    After "and", please delete "a" and insert --α-- therefor.

In the Claims:

Claim 5, Col. 10, line 25    Please delete "1" and insert --4-- therefor.

Signed and Sealed this
Twenty-sixth Day of November, 2013

Margaret A. Focarino
*Commissioner for Patents of the United States Patent and Trademark Office*